(12) United States Patent
Khan (10) Patent No.: US 8,355,376 B2
(45) Date of Patent: Jan. 15, 2013

(54) BROADCAST SCHEME FOR A MULTI-CARRIER WIRELESS NETWORK

(75) Inventor: Farooq Khan, Allen, TX (US)

(73) Assignee: Samsung Electronics Co., Ltd, Suwon-Si (KR)

(*) Notice: Subject to any disclaimer, the term of this patent is extended or adjusted under 35 U.S.C. 154(b) by 1492 days.

(21) Appl. No.: 11/490,858

(22) Filed: Jul. 21, 2006

(65) Prior Publication Data

US 2007/0047483 A1 Mar. 1, 2007

Related U.S. Application Data

(60) Provisional application No. 60/711,171, filed on Aug. 25, 2005.

(51) Int. Cl.
*H04W 4/00* (2009.01)
*H04B 7/216* (2006.01)
*H04L 12/43* (2006.01)

(52) U.S. Cl. ................. 370/330; 370/335; 370/458

(58) Field of Classification Search .......... 370/328, 370/330, 335, 458; 455/450, 524
See application file for complete search history.

(56) References Cited

U.S. PATENT DOCUMENTS

| | | | | |
|---|---|---|---|---|
| 5,825,758 A * | 10/1998 | Heikkinen et al. | ............ | 370/330 |
| 6,567,383 B1 * | 5/2003 | Bohnke | ............ | 370/280 |
| 6,944,146 B1 * | 9/2005 | Barany et al. | ............ | 370/338 |
| 6,985,466 B1 * | 1/2006 | Yun et al. | ............ | 370/335 |
| 7,042,862 B1 * | 5/2006 | Hirade | ............ | 370/335 |
| 7,672,667 B2 * | 3/2010 | Ramesh et al. | ............ | 455/422.1 |
| 8,000,292 B2 * | 8/2011 | Cai et al. | ............ | 370/329 |
| 2002/0142772 A1 * | 10/2002 | Hunzinger | ............ | 455/436 |
| 2002/0167992 A1 * | 11/2002 | Das et al. | ............ | 375/146 |
| 2002/0191591 A1 * | 12/2002 | Kivijarvi et al. | ............ | 370/352 |
| 2003/0119444 A1 * | 6/2003 | Yamaguchi | ............ | 455/21 |
| 2004/0131007 A1 * | 7/2004 | Smee et al. | ............ | 370/208 |
| 2004/0146026 A1 * | 7/2004 | Williams et al. | ............ | 370/335 |
| 2004/0246998 A1 * | 12/2004 | Ma et al. | ............ | 370/527 |
| 2005/0075125 A1 * | 4/2005 | Bada et al. | ............ | 455/525 |
| 2006/0018269 A1 * | 1/2006 | Agrawal et al. | ............ | 370/321 |
| 2006/0199596 A1 * | 9/2006 | Teauge et al. | ............ | 455/458 |
| 2007/0167180 A1 * | 7/2007 | Ramesh et al. | ............ | 455/502 |

OTHER PUBLICATIONS

Zhengang Pan; Kai-Kit Wong; Tung-Sang Ng;."Signal Processing Advances in Wireless Communications, 2004 IEEE 5th Workshop on (0-7803-8337-0)"Jul. 11-14, 2004. p. 348.*

* cited by examiner

*Primary Examiner* — Man Phan
*Assistant Examiner* — Ryan Kavleski (57) ABSTRACT

A base station for use in an OFDM/OFDMA wireless network. The base station transmits system-specific broadcast control channel (BCCH) information in a first group of time-frequency slots and transmits cell-specific BCCH information in a second group of time-frequency slots. The time-frequency slots in the first group are orthogonal to the time-frequency slots in the second group. The base station transmits the system-specific BCCH information in the same time-frequency slots as a neighboring base station. The neighboring base station transmits cell-specific BCCH information in a third group of time-frequency slots that may or may not be orthogonal to the time-frequency slots in the second group.

20 Claims, 8 Drawing Sheets

BROADCAST SCHEME FOR A MULTI-CARRIER WIRELESS NETWORK

CROSS-REFERENCE TO RELATED APPLICATIONS AND CLAIMS OF PRIORITY

The present application is related to U.S. Provisional Patent No. 60/711,171, filed Aug. 25, 2005, entitled "Broadcast Signaling In An OFDM System". U.S. Provisional Patent No. 60/711,171 is assigned to the assignee of this application and is hereby incorporated by reference as if fully set forth herein. The present application hereby claims priority under 35 U.S.C. §119(e) to U.S. Provisional Patent No. 60/711,171.

TECHNICAL FIELD OF THE INVENTION

The present application relates generally to wireless communications and, more specifically, to a broadcast scheme for transmitting system-specific broadcast information cell-specific broadcast information in a multicarrier wireless network.

BACKGROUND OF THE INVENTION

Orthogonal frequency division multiplexing (OFDM) networks and orthogonal frequency division multiple access (OFDMA) networks support the transmission of both broadcast traffic, intended for multiple subscriber stations (i.e., user devices), and unicast traffic, intended for a single subscriber station. A wireless network uses a point-to-multipoint broadcast control channel (BCCH) to transmit specific parameters that enable a subscriber station to identify and access the wireless network. These parameters include system-specific information and cell-specific information.

Some examples of system-specific information are wireless network identification (ID), location area and routing area information, and the like. The cell-specific parameters may include, for example, the current control channel structure and OFDM parameters, such as the cyclic prefix length used in a cell. For example, the broadcast control channel (BCCH) in a UMTS network broadcasts cell-specific and system specific information. The BCCH maps into the BCH transport channel, which maps into the Primary Common Control Physical Channel (P-CCPCH) at the physical layer. There is only one P-CCPCH within a cell site and it carries synchronization and broadcast information for subscriber stations.

The P-CCPCH has a fixed rate of 30 kbps and a spreading factor of 256. The channelization code for the Primary CCPCH is a predefined value known to the subscriber stations. A predefined channelization code (or Walsh code) enables subscriber stations that are not yet connected to the network to decode the BCCH and thereby gain access to the cell-specific and system-specific information.

Unfortunately, conventional wireless systems, including multicarrier networks (e.g., OFDMA networks), use a single broadcast channel to carry the system-specific and cell-specific information. This results in system inefficiency due to broadcast control channel interference between neighboring cells.

Therefore, there is a need for improved OFDM (or OFDMA) transmission systems that minimize broadcast control channel interference between neighboring cells.

SUMMARY OF THE INVENTION

In one embodiment of the present disclosure, a base station is provided for use in a multicarrier (i.e., OFDM, OFDMA) wireless network capable of communicating with a plurality of subscriber stations in a coverage area of the multicarrier wireless network. The base station is capable of transmitting system-specific broadcast control channel information in a first group of time-frequency slots and is further capable of transmitting cell-specific broadcast control channel information in a second group of time-frequency slots. The time-frequency slots in the first group and the time-frequency slots in the second group are orthogonal to each other.

In another embodiment of the present disclosure, a method of transmitting broadcast control channel information is provided for use in a multicarrier wireless network capable of communicating with a plurality of subscriber stations in a coverage area of the multicarrier wireless network. The method comprises the steps of: i) transmitting from a first base station and a second base station system-specific broadcast control channel information in a first group of time-frequency slots; ii) transmitting from the first base station cell-specific broadcast control channel information in a second group of time-frequency slots, wherein the time-frequency slots in the first group and the time-frequency slots in the second group are orthogonal to each other; and iii) transmitting from the second base station cell-specific broadcast control channel information in a third group of time-frequency slots. The time-frequency slots in the first group and the time-frequency slots in the third group are orthogonal to each other.

In another embodiment of the present disclosure, a subscriber station is provided for use in a multicarrier wireless network. The subscriber station is capable of receiving from a first base station system-specific broadcast control channel information in a first group of time-frequency slots and is further capable of receiving from the first base station cell-specific broadcast control channel information in a second group of time-frequency slots. The time-frequency slots in the first group and the time-frequency slots in the second group are orthogonal to each other.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

The present disclosure is directed to a transmission technique in which system-specific BCCH traffic and cell-specific BCCH information are separately coded and mapped to time-frequency slots (resources) in such a way that system-specific BCCH traffic is transmitted in the same time-frequency slots in all the cells in which the system-specific information is applicable, while the cell-specific BCCH traffic is mapped to orthogonal time-frequency slots in neighboring cells.

Figure 1:
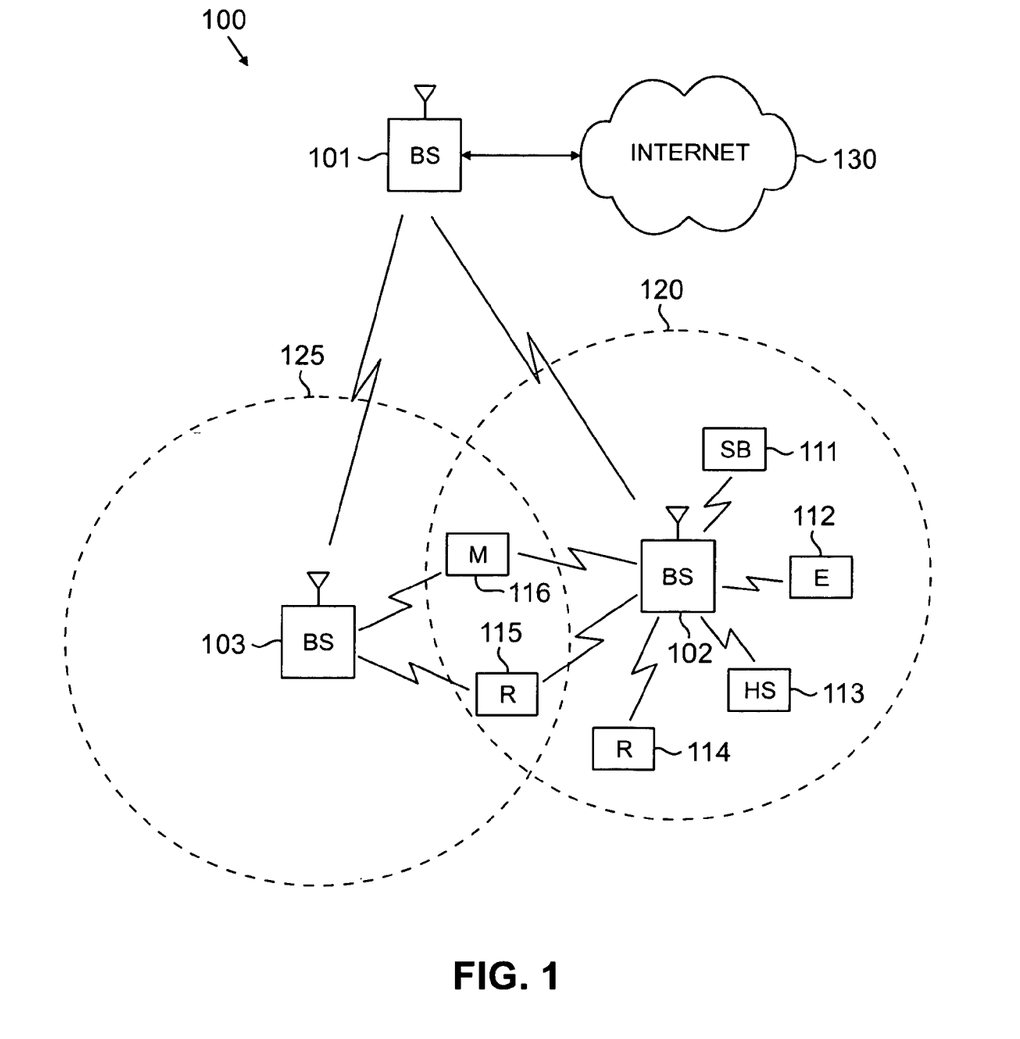
FIG. 1 illustrates an exemplary wireless network that broadcasts the system-specific broadcast control channel and cell-specific broadcast control channel traffic in the downlink according to the principles of the present disclosure.

FIG. 1 illustrates exemplary wireless network 100, which broadcasts system-specific broadcast control channel (BCCH) traffic and cell-specific broadcast control channel (BCCH) traffic in the downlink according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2:
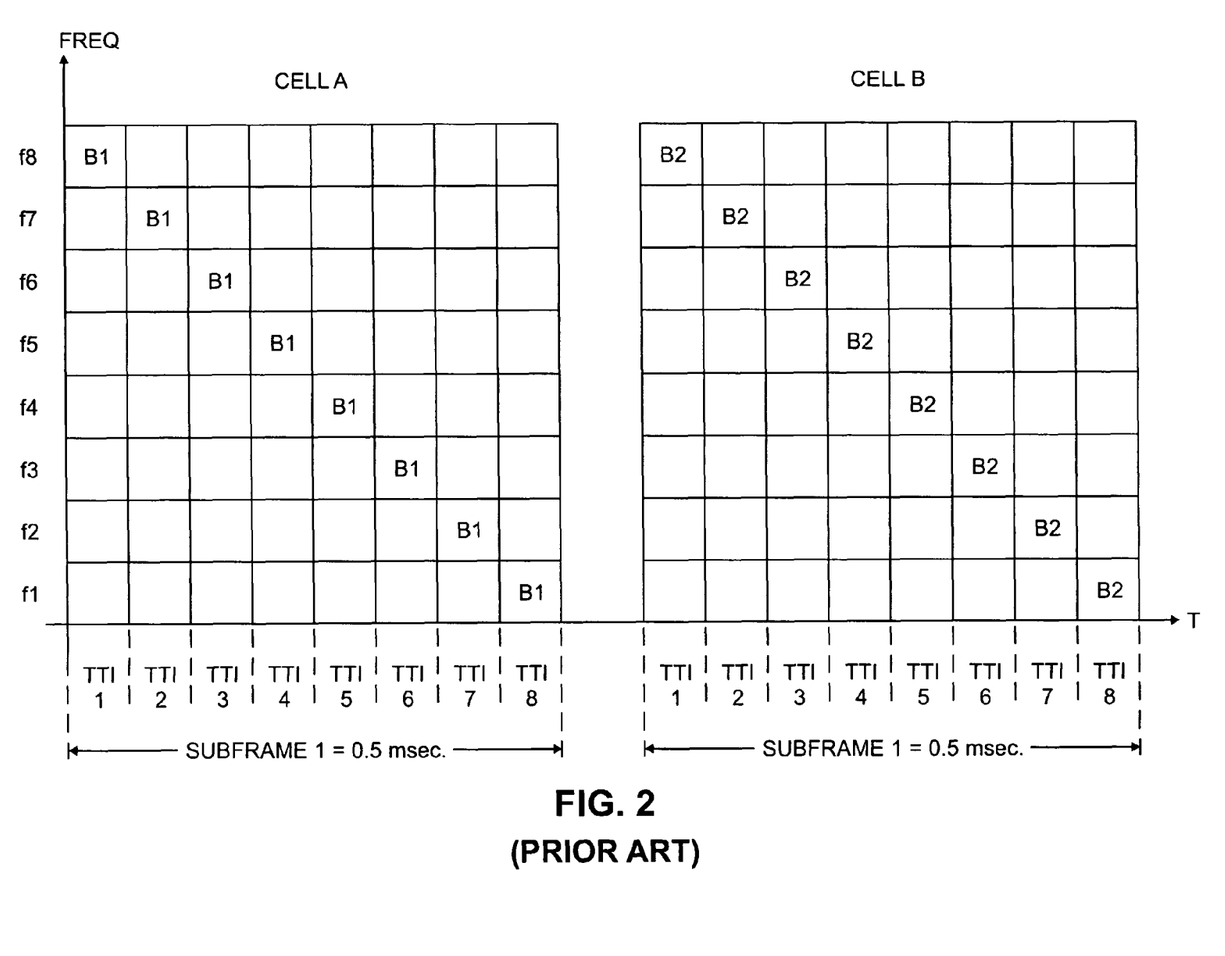
FIG. 2 illustrates an exemplary broadcast control channel (BCCH) transmission scheme according to one embodiment of the prior art.

FIG. 2 illustrates an exemplary broadcast control channel (BCCH) transmission scheme according to one embodiment of the prior art. FIG. 2 shows the downlink time-frequency slots available for transmitting to two neighboring cells are shown. The two neighboring cells are arbitrarily labeled Cell A and Cell B and represent any two neighboring base stations in OFDMA wireless network 100. By way of example, Cell A may be BS 102 and Cell B may be BS 103.

The available subcarriers in OFDMA wireless network 100 are divided into eight (8) orthogonal sub-carrier (SC) groups, labeled f1, f2, f3, . . . , f8. By way of example, there may be a total of 512 OFDMA subcarriers (or tones) in wireless network 100. These subcarriers may be represented as SC1, SC2, SC3, . . . , SC512. Thus, each of the eight SC groups contains 64 subcarriers. The subcarriers in each SC group may be contiguous or may be interleaved with subcarriers from other SC groups. By way of example, if contiguous subcarriers are used, then SC Group f1 may contain subcarriers (SC1-SC64), SC Group f2 may contain subcarriers (SC65-SC128), and so forth. Alternatively, if the subcarriers are interleaved (i.e., every eighth SC), then SC Group f1 may contain subcarriers (SC1, SC9, SC17, . . . , SC505), SC Group f2 may contain subcarriers (SC2, SC10, SC18, . . . , SC506), and so forth. Thus, the subcarrier groups in FIG. 2 represent logical groupings of subcarriers that may be assigned to different subscriber stations.

FIG. 2 illustrates the simultaneous transmission of the same subframe (i.e., Subframe 1) in Cell A and Cell B. Subframe 1 has a duration of 0.5 milliseconds and comprises eight (8) transmission time intervals (TTIs), labeled TTI 1 through TTI 8. Cell A transmits TTI 1 in the downlink (i.e., forward channels) at the same time Cell B transmits TTI 1. Similarly, TTI 2 in Cell A and TTI 2 in Cell B are synchronized, TTI 3 in Cell A and TTI 3 in Cell B are synchronized, and so forth. Thus, Cell A and Cell B use the same set of time-frequency slots (or bins) to transmit to subscriber stations.

Each square in FIG. 2 represents one time-frequency slot in either Cell A or Cell B. Each time-frequency slot is assignable according to a scheduling algorithm. A time-frequency slot may be assigned to a single subscriber station, as in the case of unicast data traffic, or may be assigned to a plurality of subscriber stations, as in the case of broadcast data.

In an exemplary embodiment, each transmission time interval (TTI) may be used to transmit one OFDM symbol using all 512 subcarriers. Thus, eight OFDM symbols are transmitted in Subframe 1. In the illustrated embodiment, the broadcast control channel (BCCH) information is spread across different time-frequency slots in Subframe 1. By way of example, Cell A transmits BCCH traffic (labeled B1) in SC Group f8 during TTI 1, in SC Group f7 during TTI 2, in SC Group f6 during TTI 3, and so forth. Similarly, Cell B transmits BCCH traffic (labeled B2) in SC Group f8 during TTI 1, in SC Group f7 during TTI 2, in SC Group f6 during TTI 3, and so forth. The blank time-frequency slots in Cell A and Cell B are used to transmit unicast data traffic or broadcast data traffic.

This approach makes efficient use of the time-frequency resource by reusing the BCCH resource (i.e., time-frequency slots) in neighboring cells. However, the performance of the broadcast control channel (BCCH) is degraded due to increased interference between neighboring cells.

Figure 3:
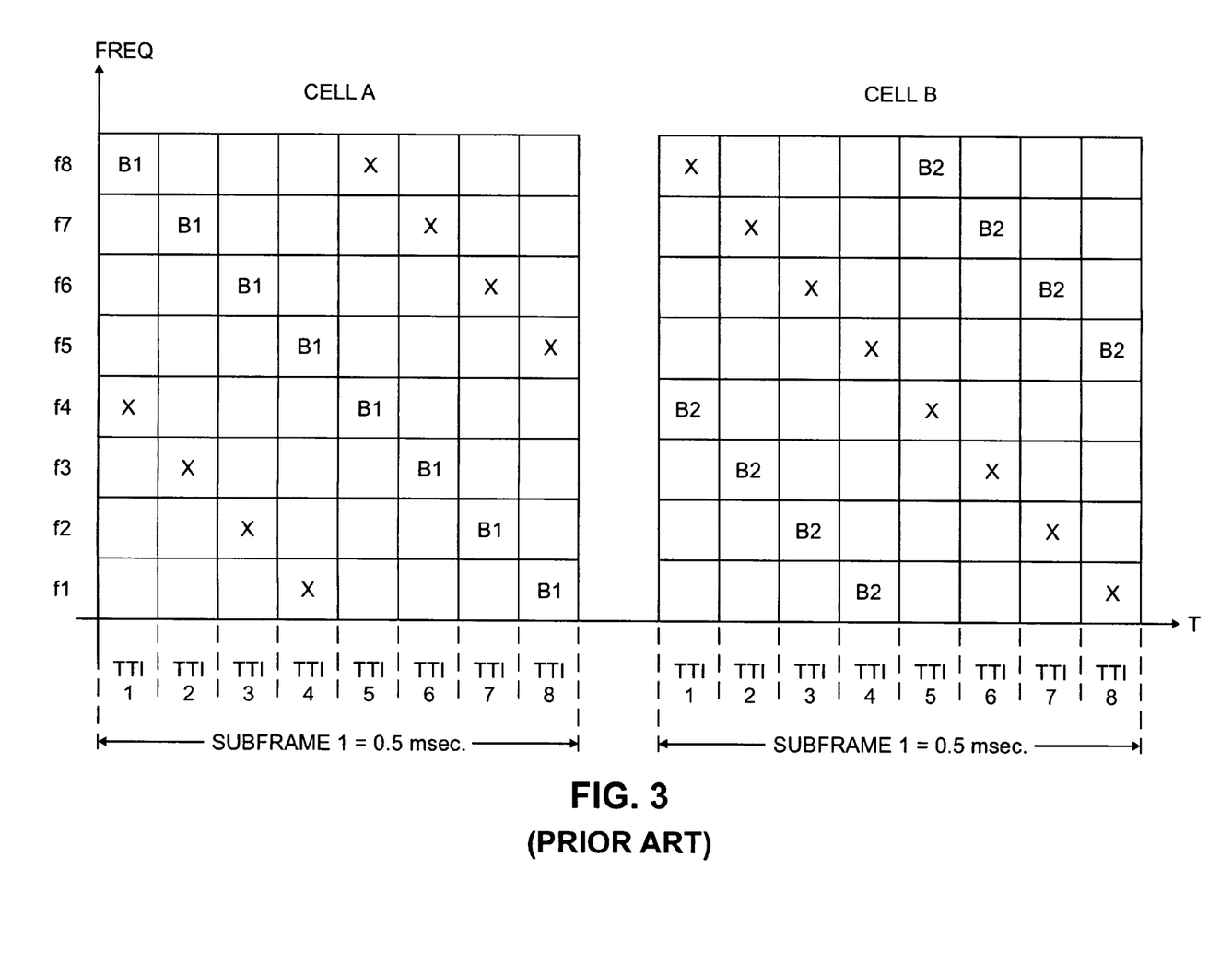
FIG. 3 illustrates an exemplary broadcast control channel (BCCH) transmission scheme according to another embodiment of the prior art.

FIG. 3 illustrates an exemplary broadcast control channel (BCCH) transmission scheme according to another embodiment of the prior art. In FIG. 3, the Cell A BCCH traffic (labeled B1) and the Cell B BCCH traffic (labeled B2) use orthogonal time-frequency slots. Thus, the time-frequency slots in Cell A labeled B1 are not used (i.e., labeled X) in Cell B. Similarly, the time-frequency slots in Cell B labeled B2 are not used (i.e., labeled X) in Cell A. This technique approach reduces the interference on the broadcast control channel (BCCH) between neighboring cells, such as Cell A and Cell B. However, this technique also results in inefficient use of the time-frequency slots because the time-frequency slots used for BCCH in one cell cannot be used in neighboring cells.

Figure 4:
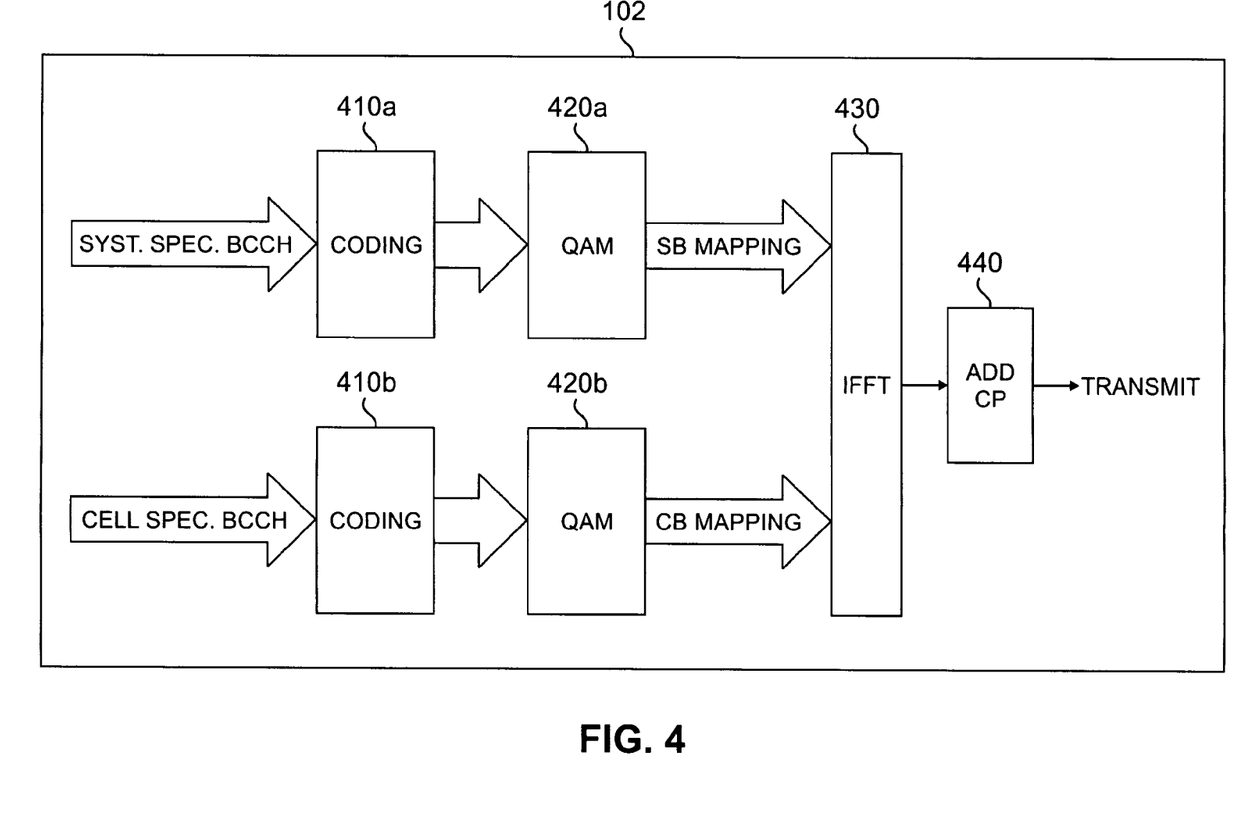
FIG. 4 is a high-level block diagram of the transmit path of a base station that broadcasts system-specific broadcast control channel traffic and cell-specific broadcast control channel traffic according to a first embodiment of the present disclosure.

FIG. 4 is a high-level block diagram of the transmit path of base station (BS) 102, which broadcasts system-specific broadcast control channel traffic and cell-specific broadcast control channel traffic according to a first embodiment of the present disclosure. FIG. 4 depicts only the processing of broadcast control channel (BCCH) information. It will be understood by those skilled in the art that broadcast data, unicast data, and various control signals (e.g., pilots channel), among others, are also processed by the transmit path of BS 102, but are not shown.

The transmit path of BS 102 comprises coding blocks 410a and 410b, quadrature amplitude modulation (QAM) blocks 420a and 420b, Size N inverse Fast Fourier Transform (IFFT) block 430, and add cyclic prefix (CP) block 440. At least some of the components in FIG. 4 may be implemented in software while other components may be implemented by configurable hardware or a mixture of software and configurable hardware. In particular, it is noted that the IFFT block in FIG. 4 may be implemented as configurable software algorithms, where the value, N, of IFFT size may be modified according to the implementation.

Coding block 410a receives a stream of system-specific broadcast control channel (BCCH) data and codes the data according to a defined coding rate (1/2, 1/3, etc.). QAM block 420a then modulates the coded data to produce a stream of modulated data symbols. The system-specific broadcast (SB) symbols are then mapped to selected ones of the N inputs of Size N IFFT block 430.

Similarly, coding block 410b receives a stream of cell-specific broadcast control channel (BCCH) data and codes the data according to a defined coding rate (1/2, 1/3, etc.). QAM block 420b then modulates the coded data to produce a stream of modulated data symbols. The cell-specific broadcast (CB) symbols are then mapped to selected ones of the N inputs of Size N IFFT block 430. Size N IFFT block 430 produces N time-domain outputs.

It will be understood by those skilled in the art that a serial-to-parallel (S/P) conversion of the serial symbol streams from QAM blocks 420a and 420b is necessary prior to the inputs of Size N IFFT block 430. Likewise, a parallel-to-serial (P/S) conversion is necessary at the output of Size N IFFT block 430. For the purpose of simplicity and clarity, the S/P and P/S conversions are not shown in FIG. 4. However, it may be assumed that the S/P conversion may be performed internally by IFFT block 430 or internally by QAM blocks 420a and 420b. Likewise, it may be assumed that the P/S conversion may be performed internally by IFFT block 430. Add CP block 440 receives the serial output of IFFT block 430 and adds a cyclic prefix (CP). The output of add CP block 440 is then up-converted prior to transmission from BS 102.

According to the principles of the present disclosure, the system-specific BCCH traffic and the cell-specific BCCH traffic are separately coded and mapped to different time-frequency resources in such a way that the same time-frequency positions are used in all cells for the system-specific BCCH, while the cell-specific BCCH information is mapped to orthogonal time-frequency resource in neighboring cells.

Figure 5:
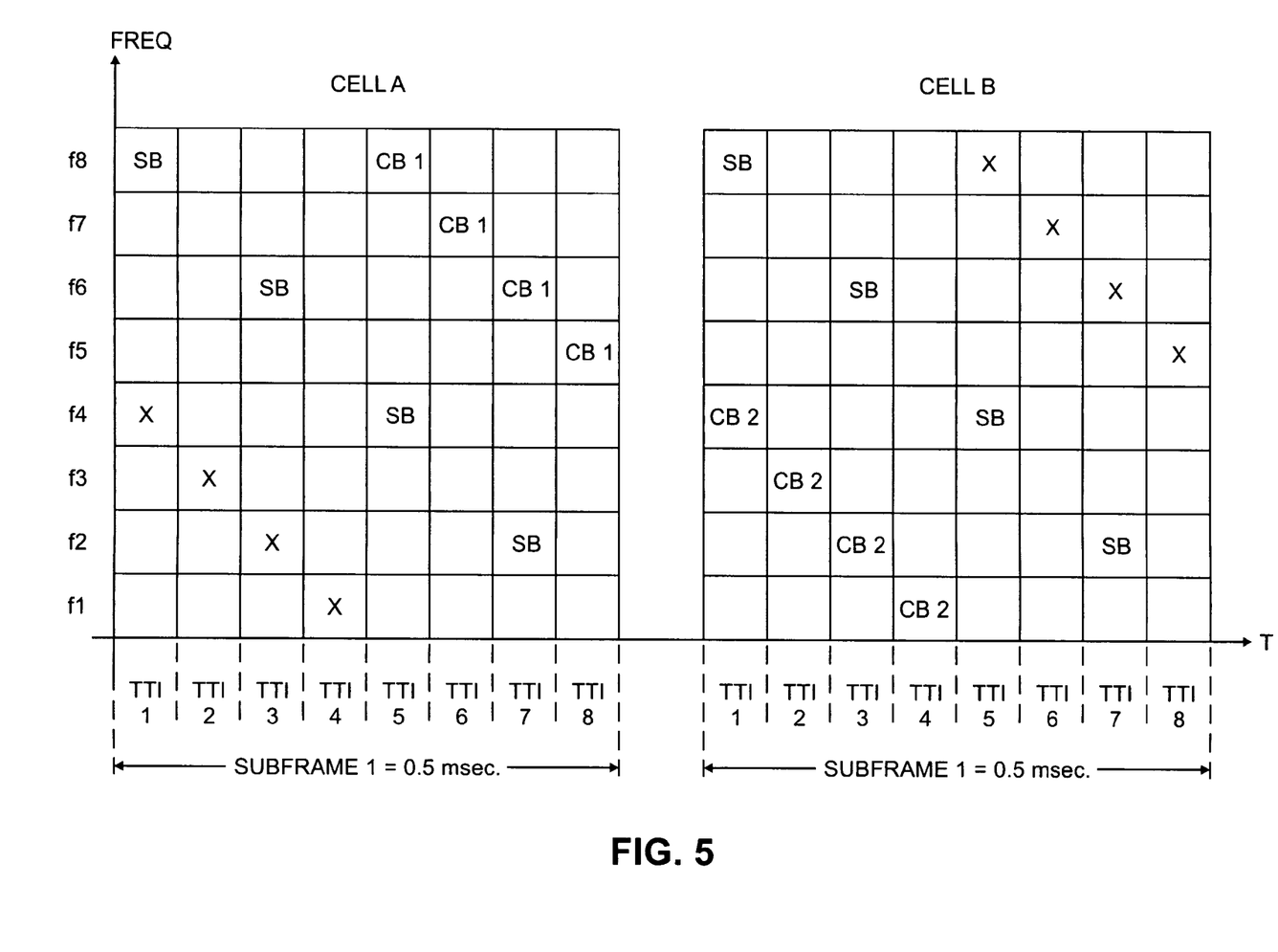
FIG. 5 illustrates a first exemplary broadcast control channel (BCCH) transmission scheme according to the principles of the present disclosure.

FIG. 5 illustrates a first exemplary broadcast control channel (BCCH) transmission scheme according to the principles of the present disclosure. In FIG. 5, the broadcast control channel (BCCH) is divided into two subcategories: system specific and cell specific. The system-specific BCCH traffic typically applies to all cells in wireless network 100, but the cell-specific BCCH traffic applies only to individual cells (e.g., BS 102, BS 103).

In FIG. 5, the system-specific broadcast control channel (BCCH) information (labeled SB) is mapped to the same time-frequency slots in Cell A and Cell B. However, the cell-specific BCCH information in Cell A (labeled CB1) is mapped to time-frequency slots that are orthogonal to the time-frequency slots that carry the cell-specific BCCH information in Cell B (labeled CB2). Since the system-specific broadcast control channel carries the same information in all of wireless network 100, the system-specific BCCH signals from multiple cells mapped to the same time-frequency resource reinforce each other according to the principle of OFDM-based single frequency network (SFN) operations.

The cell-specific BCCH information is mapped to orthogonal time-frequency resources among the neighboring cells. Therefore, the time-frequency slots used in Cell A for Cell A-specific BCCH information would not be used in any neighboring cells, including Cell B, for any form of transmission, as is indicated in FIG. 5 by the "X" label in those positions. By using orthogonal time-frequency slots for cell-specific information, the cell-specific BCCH data in a first cell and the cell-specific BCCH data in a second cell do not interfere with each other. Using this approach, orthogonal time-frequency resources are only needed for the cell-specific BCCH information and not for the system-specific BCCH information, thereby making efficient use of the system resources.

Figure 6:
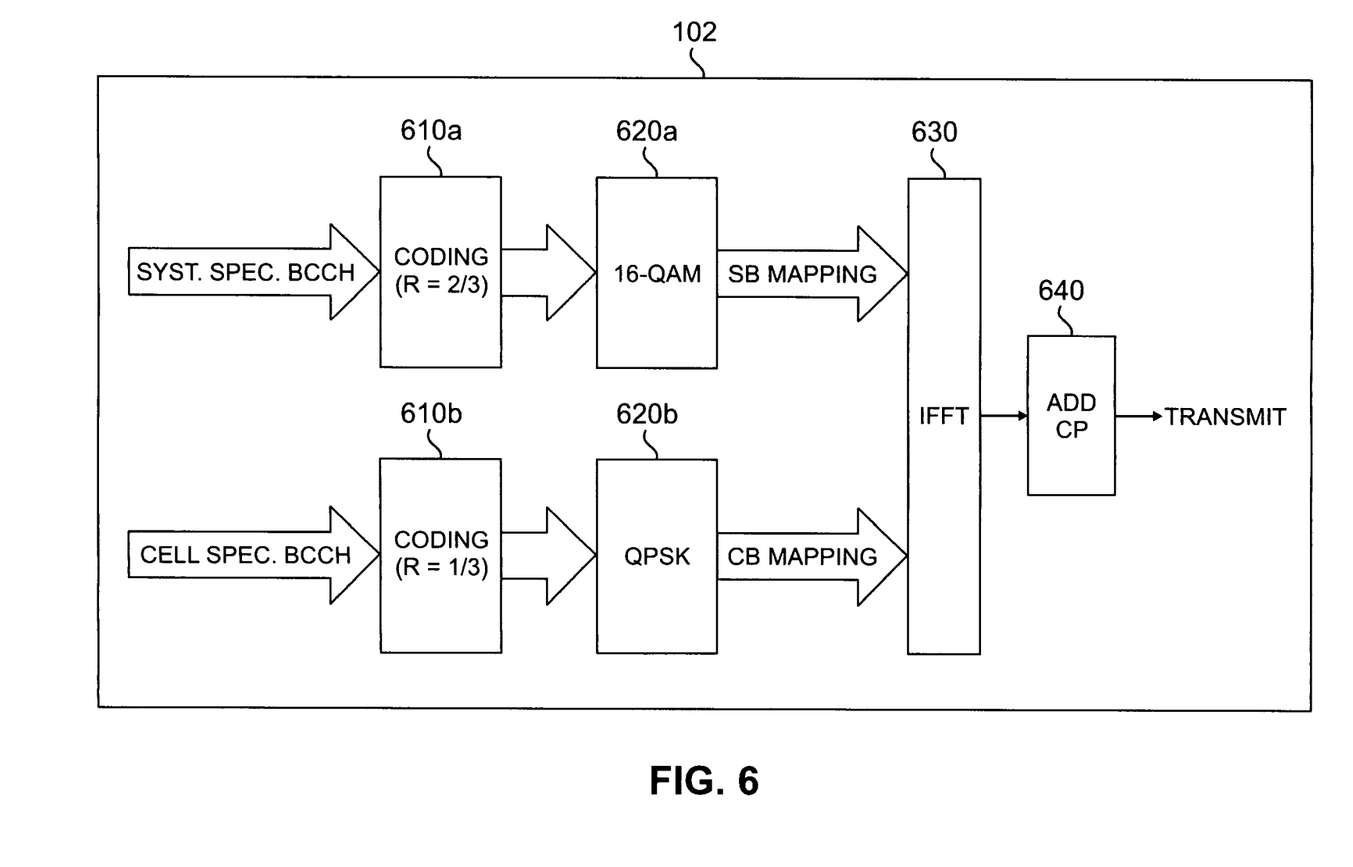
FIG. 6 is a high-level block diagram of the transmit path of a base station according to a second embodiment of the present disclosure.

FIG. 6 is a high-level block diagram of the transmit path of base station (BS) 102 according to a second embodiment of the present disclosure. As in FIG. 4, FIG. 6 depicts only the processing of broadcast control channel (BCCH) information. The transmit path of BS 102 comprises coding (R=2/3) block 610a, coding (R=1/3) block 610b, 16-quadrature amplitude modulation (16-QAM) block 620a, quadrature phase shift keying (QPSK) block 620b, Size N inverse Fast Fourier Transform (IFFT) block 630, and add cyclic prefix (CP) block 640.

The transmit path in BS 102 in FIG. 6 operates substantially similarly to the transmit path in FIG. 4. However, in FIG. 6, the coding rate (R=1/3) applied to the cell-specific BCCH information by coding block 610b is lower (i.e., stronger) than the coding rate (R=2/3) applied to the system-specific BCCH information by coding block 610a. Similarly, the modulation scheme (QPSK) applied to the cell-specific BCCH information by QPSK block 620b is lower (i.e., stronger) than the modulation rate (16-QAM) applied to the system-specific BCCH information by 16-QAM block 620a. Alternatively, cell-specific BCCH can use a higher power level than system specific BCCH.

Figure 7:
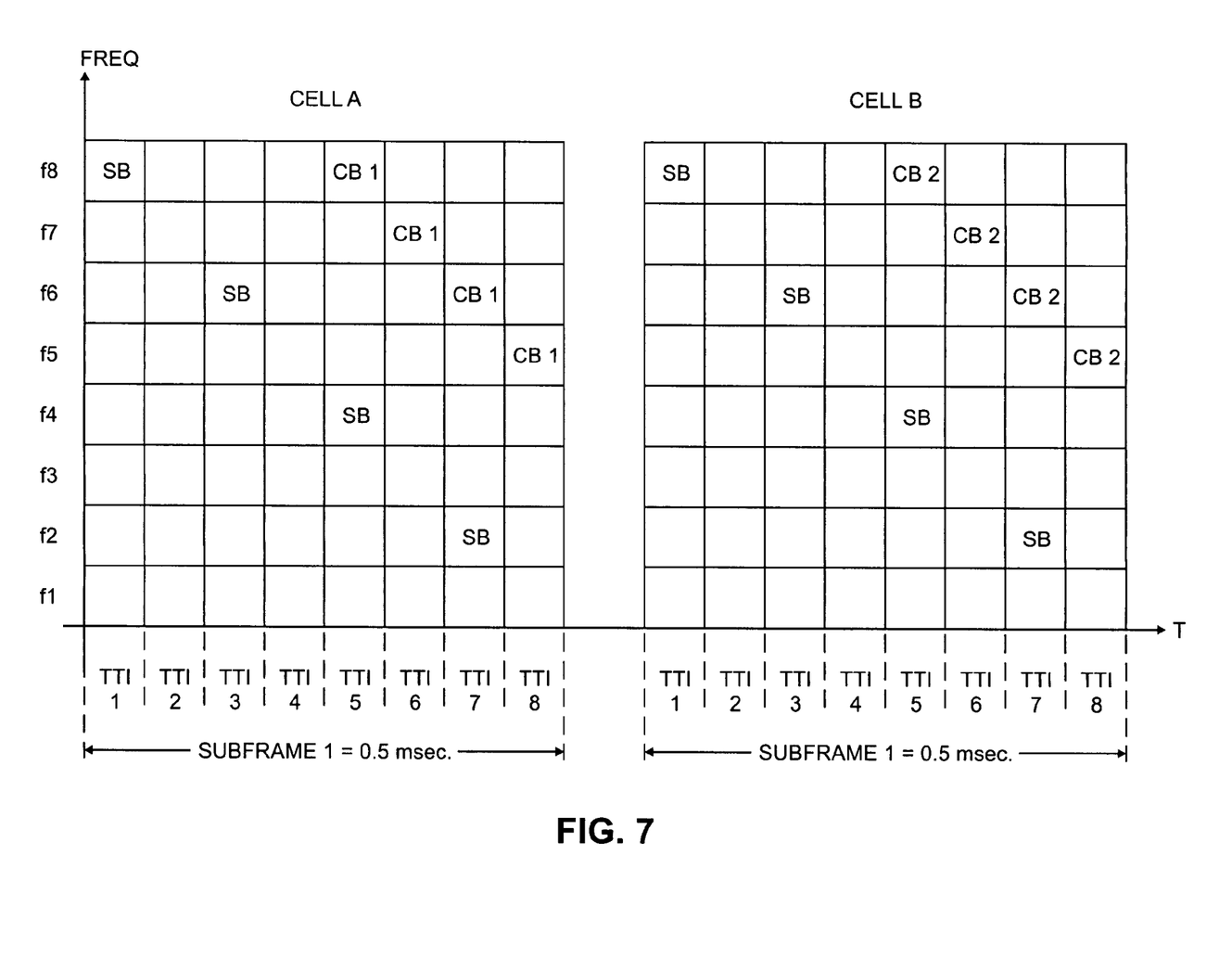
FIG. 7 illustrates a second exemplary broadcast control channel (BCCH) transmission scheme according to the principles of the present disclosure.

FIG. 7 illustrates a second exemplary broadcast control channel (BCCH) transmission scheme according to the principles of the present disclosure. The transmission scheme in FIG. 7 may be used with the transmit path architecture shown in FIG. 6. In FIG. 7, it is noted that, unlike in FIG. 5, the cell-specific BCCH information (CB1) in Cell A and the cell-specific BCCH information (CB2) in Cell B may be transmitted using the same time-frequency slots in neighboring Cells A and B. However, the time-frequency slots of the cell-specific BCCH information are still orthogonal to the system-specific BCCH in Cells A and B.

In the example of FIG. 6, the system-specific BCCH data uses rate R=2/3 coding and 16-QAM modulation while the cell-specific BCCH data uses a stronger rate R=1/3 coding and a relatively stronger QPSK modulation. The stronger modulation and coding guarantee reliable transmission of cell-specific BCCH information, even though the cell-specific BCCH signals from neighboring cells interfere with each other, resulting in lower Signal-to-Noise-plus Interference Ratio (SINR). However, the system-specific BCCH data carries the same information from multiple cells and, therefore, these signals reinforce each other, thereby resulting in higher SINR. As a result, a weaker modulation and coding scheme may be used under high SINR for reliable transmission of system-specific BCCH data.

Figure 8:
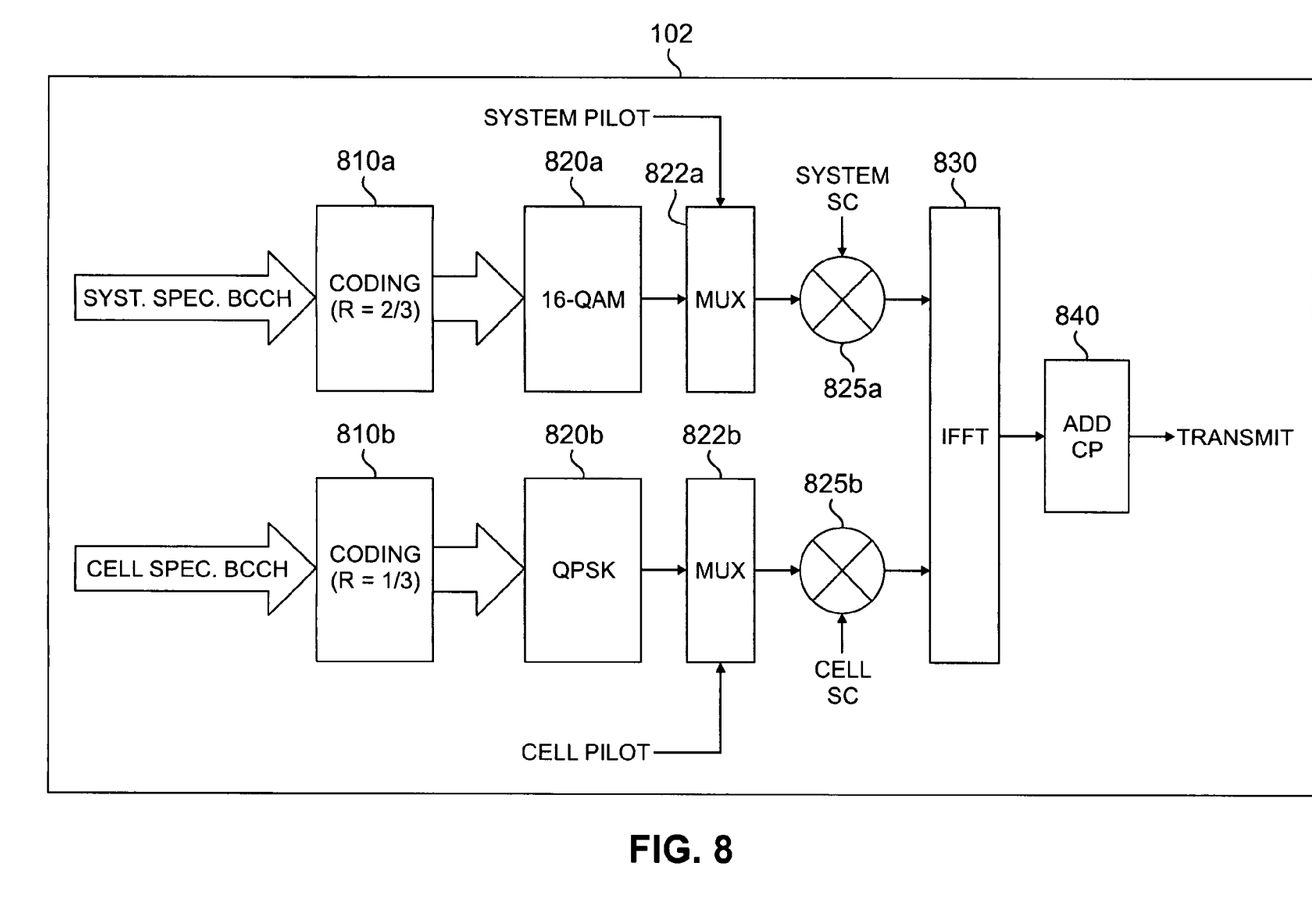
FIG. 8 is a high-level block diagram of the transmit path of a base station according to a third embodiment of the present disclosure.

FIG. 8 is a high-level block diagram of the transmit path of base station (BS) 102 according to a third embodiment of the present disclosure. As in FIGS. 4 and 6, FIG. 8 depicts only the processing of broadcast control channel (BCCH) information. The transmit path of BS 102 comprises coding (R=2/3) block 810a, coding (R=1/3) block 810b, 16-quadrature amplitude modulation (16-QAM) block 820a, quadrature phase shift keying (QPSK) block 820b, multiplexer (MUX) 822a, multiplexer (MUX) 822b, multiplier 825a, multiplier 825b, Size N inverse Fast Fourier Transform (IFFT) block 830, and add cyclic prefix (CP) block 840.

The transmit path in BS 102 in FIG. 8 operates substantially similarly to the transmit path in FIG. 6. However, in FIG. 8, the system-specific BCCH information and the system pilot signals are combined by MUX 822a and are then scrambled by multiplier 825a using a system-specific scrambling code (SC) Similarly, the cell-specific BCCH information and the cell pilot signals for BS 102 are combined by MUX 822b and are then scrambled by multiplier 825b using a cell-specific scrambling code (SC). Advantageously, the cell-specific scrambling codes are different in each neighboring cell, so that no two cell-specific scrambling codes in neighboring cells are the same, while the system-specific scrambling code is common to all the cells in which the system-specific BCCH information is applicable.

Advantageously, in the apparatuses and methods discussed above, the broadcast control channel (BCCH) information is carried over two broadcast channels. One broadcast channel (BCH) carries the system-specific information, while the other BCH carries the cell-specific information. The system-specific information is carried using the same time-frequency slots (or resource) in all the cells in the wireless network, while the cell-specific broadcast information uses orthogonal time-frequency slots (or resource) among the neighboring cells.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a multicarrier wireless network capable of communicating with a plurality of subscriber stations in a coverage area of the multicarrier wireless network, a base station configured to:
    transmit system-specific broadcast control channel information without any cell-specific broadcast control channel information in a first group of time frequency slots that are the same as time-frequency slots used by a neighboring base station to transmit system-specific broadcast control channel information without any cell-specific broadcast control channel information;
    transmit cell-specific broadcast control channel information in a second group of time frequency slots that are orthogonal to time-frequency slots used by the neighboring base station to transmit cell-specific broadcast control channel information and also are orthogonal to the first group of time-frequency slots; and
    combine the cell-specific broadcast control channel information with a cell-specific pilot signal to produce a combined cell-specific output signal and scramble the combined cell-specific output signal using a cell-specific scrambling code,
    wherein the time-frequency slots in the first group are different from the time-frequency slots in the second group.

2. The base station as set forth in claim 1, wherein the base station is further configured to apply a first coding rate to the cell-specific broadcast control channel information and a second coding rate to the system-specific broadcast control channel information and wherein the second coding rate is higher than the first coding rate.

3. The base station as set forth in claim 1, wherein the base station is further configured to apply a first modulation rate to the cell-specific broadcast control channel information and a second modulation rate to the system-specific broadcast control channel information and wherein the second modulation rate is higher than the first modulation rate.

4. The base station as set forth in claim 1, wherein the base station is further configured to combine the system-specific broadcast control channel information with a system-specific pilot signal to produce a combined system-specific output signal and scramble the combined system-specific output signal using a system-specific scrambling code.

5. The base station as set forth in claim 2, wherein the base station is further configured to apply a first modulation rate to the cell-specific broadcast control channel information and a second modulation rate to the system-specific broadcast control channel information and wherein the second modulation rate iS higher than the first modulation rate.

6. A multicarrier wireless network comprising:
a plurality of base stations configured to communicate with a plurality of subscriber stations in a coverage area of the multicarrier wireless network, wherein:
- a first base station and a second base station are configured to transmit system-specific broadcast control channel information without any cell-specific broadcast control channel information in a first group of time-frequency slots;
- the first base station is configured to transmit cell-specific broadcast control channel information in a second group of time-frequency slots, wherein the time-frequency slots in the first group are different from the time-frequency slots in the second group;
- the second base station is configured to transmit cell-specific broadcast control channel information in a third group of time-frequency slots, wherein the time-frequency slots in the first group and the time-frequency slots in the third group are orthogonal to each other, and wherein the time-frequency slots in the second group and the time-frequency slots in the third group are orthogonal to each other; and
- the first and second base stations are further configured to combine the cell-specific broadcast control channel information with a cell-specific pilot signal to produce a combined cell-specific output signal and scramble the combined cell-specific output signal using a cell-specific scrambling code.

7. The multicarrier wireless network as set forth in claim 6, wherein the first and second base stations are configured to apply a first coding rate to the cell-specific broadcast control channel information and a second coding rate to the system-specific broadcast control channel information and wherein the second coding rate is higher than the first coding rate.

8. The multicarrier wireless network as set forth in claim 6, wherein the first and second base stations are configured to apply a first modulation rate to the cell-specific broadcast control channel information and a second modulation rate to the system-specific broadcast control channel information and wherein the second modulation rate is higher than the first modulation rate.

9. The multicarrier wireless network as set forth in claim 6, wherein the first and second base stations are further configured to combine the system-specific broadcast control channel information with a system-specific pilot signal to produce a combined system-specific output signal and scramble the combined system-specific output signal using a system-specific scrambling code.

10. The multicarrier wireless network as set forth in claim 7, wherein the first and second base stations are configured to apply a first modulation rate to the cell-specific broadcast control channel information and a second modulation rate to the system-specific broadcast control channel information and wherein the second modulation rate is higher than the first modulation rate.

11. For use in a multicarrier wireless network capable of communicating with a plurality of subscriber stations in a coverage area of the multicarrier wireless network, a method of transmitting broadcast control channel information, the method comprising the steps of:
- transmitting system-specific broadcast control channel information without any cell-specific broadcast control channel information in a first group of time-frequency slots that are the same as time-frequency slots used by a neighboring base station to transmit system-specific broadcast control channel information without any cell-specific broadcast control channel information;
- transmitting cell-specific broadcast control channel information in a second group of time-frequency slots that are orthogonal to time-frequency slots used by said neighboring base station to transmit cell-specific broadcast control channel information and also are orthogonal to the first group of time-frequency slots;
- combining the cell-specific broadcast control channel information with a cell-specific pilot signal to produce a combined cell-specific output signal; and
- scrambling the combined cell-specific output signal using a cell-specific scrambling code,
wherein the time-frequency slots in the first group are different from the time-frequency slots in the second group.

12. The method as set forth in claim 11, further comprising:
- applying a first coding rate to the cell-specific broadcast control channel information; and
- applying a second coding rate to the system-specific broadcast control channel information, wherein the second coding rate is higher than the first coding rate.

13. The method as set forth in claim 11, further comprising:
- modulating the cell-specific broadcast control channel information using a first modulation rate;
- modulating the system-specific broadcast control channel information using a second modulation rate, wherein the second modulation rate is higher than the first modulation rate.

14. The method as set forth in claim 11, further comprising:
- combining the system-specific broadcast control channel information with a system-specific pilot signal to produce a combined system-specific output signal; and
- scrambling the combined system-specific output signal using a system-specific scrambling code.

15. The method as set forth in claim 12, further comprising:
- modulating the cell-specific broadcast control channel information using a first modulation rate:
  - modulating the system-specific broadcast control channel information using a second modulation rate, wherein the second modulation rate is higher than the first modulation rate.

16. For use in a multicarrier wireless network, a subscriber station capable of communicating with the multicarrier wireless network, wherein the subscriber station is configured to:
- receive system-specific broadcast control channel information without any cell-specific broadcast control channel information in a first group of time-frequency slots from a first base station;
- receive cell-specific broadcast control information from the first base station in a second group of time-frequency slots, wherein the time-frequency slots in the first group and the time-frequency slots in the second group are orthogonal to each other;
- receive the system-specific broadcast control channel information without any cell-specific broadcast control channel information in the first group of time-frequency slots from a second base station; and
- receive cell-specific broadcast control channel information from the second base station in a third group of time-frequency slots, wherein the time-frequency slots in the second group and the time-frequency slots in the third group are orthogonal to each other,
wherein the cell-specific broadcast control channel information is combined with a cell-specific pilot signal to produce a combined cell-specific output signal, and the combined cell-specific output signal is scrambled using a cell-specific scrambling code.

17. The subscriber station as set forth in claim 16, wherein the cell-specific broadcast control channel information is coded using a first coding rate and the system-specific broadcast control channel information is coded using a second coding rate and wherein the second coding rate is higher than the first coding rate.

18. The subscriber station as set forth in claim 16, wherein the cell-specific broadcast control channel information is modulated using a first modulation rate and the system-specific broadcast control channel information is modulated using a second modulation rate and wherein the second modulation rate is higher than the first modulation rate.

19. The subscriber station as set forth in claim 16, wherein the system-specific broadcast control channel information is combined with a system-specific pilot signal to produce a combined system-specific output signal, and the combined system-specific output signal is scrambled using a system-specific scrambling code.

20. The subscriber station as set forth in claim 17, wherein the cell-specific broadcast control channel information is modulated using a first modulation rate and the system-specific broadcast control channel information is modulated using a second modulation rate and wherein the second modulation rate is higher than the first modulation rate.

* * * * *